Aug. 19, 1930.   H. KATTWINKEL   1,773,533
FRICTION BODY
Filed June 21, 1928
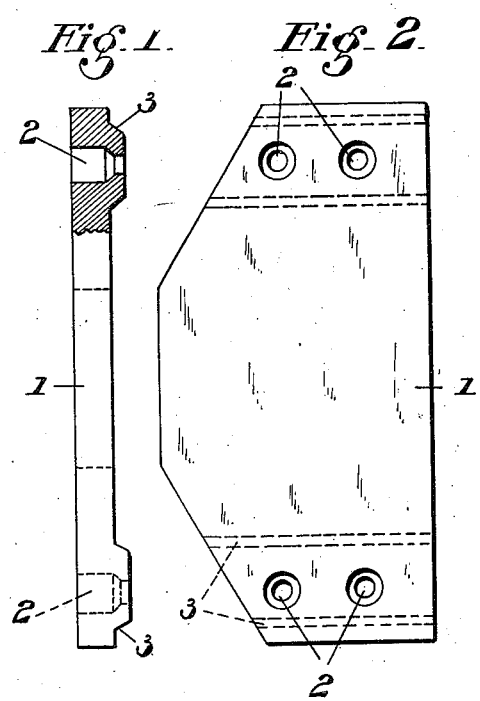

Patented Aug. 19, 1930

1,773,533

UNITED STATES PATENT OFFICE

HANS KATTWINKEL, OF COSWIG, GERMANY

FRICTION BODY

Application filed June 21, 1928, Serial No. 287,247, and in Germany February 28, 1928.

My invention relates to friction bodies, particularly intended for use in brakes, and consisting of fibrous material which is saturated with a subsequently hardening binding medium particularly an artificial resin f. i. bakelite, or another phenol formaldehyde condensation product.

One object of my invention is to provide a friction body of the type described in the form of a substantially flat plate, which is formed with one or more ledge-like projections integral with the material of the friction body and adapted to receive the thrusts exerted upon the friction body when in operation. Another object of my invention is to form said projections simultaneously with the moulding and hardening the friction body. Another object is to form holes adapted to receive the means for fastening the friction body to its carrier simultaneously with the moulding and hardening the friction body. Further objects of my invention will appear as the following description will proceed, which description refers to the accompanying drawing.

In the drawing which illustrates by way of example one constructional form of my invention Fig. 1 shows the friction body, designed as a brake covering, in a view from the top edge, partly in section through one of the rivet holes, while Fig. 2 is a view on the working side of the friction body.

The friction body 1 is manufactured in a manner known in itself from a mass which is at first plastic and which consists of a fibrous material, asbestos for example, which is saturated with a subsequently hardening binding medium, for instance a solution of "bakelite" or another artificial or synthetic resin.

The mass is then heated in a mould, which corresponds to the ultimate shape to be given to the friction body in question, under heavy pressure, whereby the hardening is effected. According to the present invention ledge-like projections or strips 3 provided in the region of the margin of the body 1 are moulded at the same time during the moulding of the impregnated mass of fibrous material and preferably also holes 2 serving for the reception of the fastening rivets are moulded simultaneously. The strips or projections 3 when the friction body is connected with its carrier, are let into corresponding grooves provided in the latter, whereby the stresses arising in the plane of the friction body are kept away from the rivets or other fastening means and taken directly by the carrier. The strips 3 are formed by pressing the impregnated mass of fibrous material while still plastic into the mould provided with grooves corresponding to the strips, while the rivet holes 2 are produced by pressing suitably shaped mandrels provided on the opposite side of the mould into the plastic mass of friction material during the closing of the mould, the material being thrust aside at the points affected, so as to produce the rivet holes after the hardening of the friction material and after the opening of the mould. The parts of the holes receiving the rivet heads are preferably positioned so deep that the rivet heads do not project or only project a little beyond the under surface of the friction body 1 in an upward direction, so that the said surface can be worn away to the last residue before the rivet heads project. By the displacement and consolidation of the mass of friction material, which is normally traversed with threads and brass wires to increase its strength, the material in the neighbourhood of the rivet holes is considerably strengthened. The strips 3 enclosing the rivet holes also assist in this.

The invention is not limited to friction bodies of the outline form illustrated but may be employed with friction bodies of any desired form, and it is a matter of indifference whether the friction bodies are utilized for brake purposes or for other purposes, for friction clutches for example. The invention, however, relates especially to friction bodies having the form of flat plates which are substantially plane at least on one side.

Of course instead of two strips as represented less or more strips may be provided without departing from the spirit of my invention. Furthermore, the strip or strips may be arranged as extending in another direction as indicated, for instance in a cross direction to that shown in the drawing.

I claim:

1. A friction body having the form of a flat plate consisting of a hardened mixture of a fibrous material such as asbestos and a binding means such a phenolic condensation product, one of the two flat sides of said plate forming a plane friction surface and the opposite flat plate side being provided with at least one projecting ledge, said ledge forming a coherent unitary piece of material with the main portion of the plate and allowing of an insertion and detaching of the friction body into and from corresponding grooves of the carrier by a slipping motion in the plane of the plate, and at least one hole provided in said ledge during the moulding and hardening of the plate, said hole extending vertically to the flat sides of the plate and serving for the reception of fastening means.

2. A friction body having the form of a flat plate consisting of a hardened mixture of a fibrous material such as asbestos and a binding means such as a phenolic condensation product, one of the two flat sides of said plate forming a plane friction surface and the opposite flat plate side being provided with at least one projecting ledge, said ledge forming a coherent unitary piece of material with the main portion of the plate and allowing of an insertion and detaching of the friction body into and from corresponding grooves of the carrier by a slipping motion in the plane of the plate, and at least one hole in said ledge for the reception of fastening means, said hole being extending vertically to the flat sides of the plate and being countersunk to about the plane of the opposite flat side of the plate.

In testimony whereof I affix my signature.

HANS KATTWINKEL.